April 6, 1943.  J. D. McCLUER  2,315,867
ELECTRICAL RECTIFIER
Filed Aug. 8, 1941

INVENTOR
John D. McCluer
BY
HIS ATTORNEY

Patented Apr. 6, 1943

2,315,867

UNITED STATES PATENT OFFICE 2,315,867

ELECTRICAL RECTIFIER

John D. McCluer, Charlotte, N. C., assignor to The Union Switch and Signal Company, Swissvale, Pa., a corporation of Pennsylvania Application August 8, 1941, Serial No. 406,019

4 Claims. (Cl. 175—366)

My invention relates to electrical rectifiers, and particularly to electrical rectifiers of the dry disc type.

One well-known form of dry disc rectifier comprises a copper washer having a coating of copper oxide formed on one or both sides thereof. In commercial rectifiers of this type, the rectifier washers are frequently stacked on an insulated bolt under pressure with a contact washer interposed in the stack adjacent each oxide surface. Heretofore, these contact washers have usually comprised a tinned lead washer having a somewhat larger inside diameter and a somewhat smaller outside diameter than the oxide washers, and in assembling the stacks it has been necessary to assemble these contact washers with considerable care because if a washer is not properly centered there is always the danger that the necessary stack pressure will squeeze the inner or outer edge or both of the non-centered washer past the edge of the oxide coating of the contiguous rectifier washer into engagement with the mother copper, and thus short circuit the washer.

One object of my present invention is to provide an improved contact washer which is self-centering.

According to my invention, the contact washers are formed by plating lead onto a metal washer having an inside diameter which is the same size as the inside diameter of the rectifier washers, and an outside diameter which is slightly smaller than the outside diameter of the rectifier washers, suitable means being provided to prevent the lead from being deposited onto the metal washer for a small annular area adjacent the inner edge of the contact washer. The lead can be plated onto only one or on both sides of the contact washer, as desired.

Other objects and characteristic features of my invention will become apparent as the description proceeds.

I shall describe one form of electrical rectifier embodying my invention, and shall then point out the novel features thereof in claims.

Figure 1:
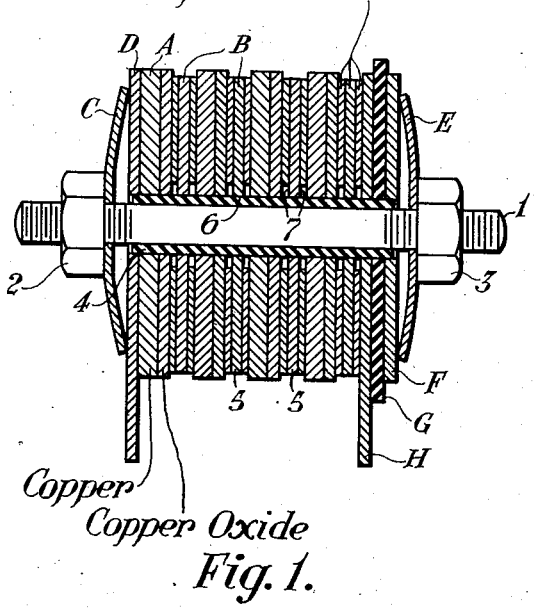
Figure 2:
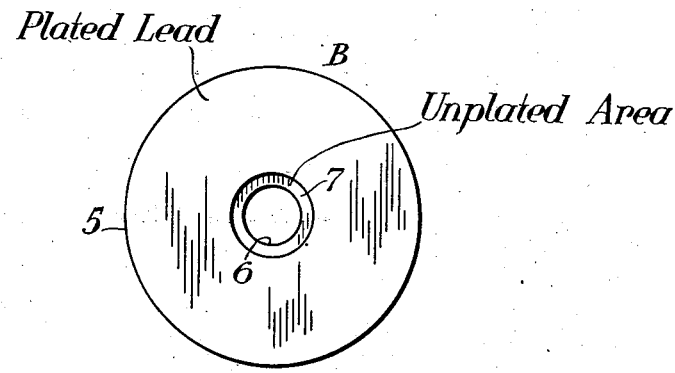

In the accompanying drawing, Fig. 1 is a vertical longitudinal sectional view showing one form of electrical rectifier embodying my invention. Fig. 2 is a plan view of one of the contact washers B embodying my invention and forming part of the stack shown in Fig. 1.

Similar reference characters refer to similar parts in both views.

Referring first to Fig. 1, the rectifier here shown comprises a plurality of asymmetric units A stacked on a bolt 1 provided with clamping nuts 2 and 3, and surrounded by an insulating sleeve 4 which insulates the units from the bolt. Each asymmetric unit, as here shown, is of the copper oxide variety, and comprises a copper washer oxidized on one side to provide a rectifying junction. Asymmetric units of this type are well known, and they exhibit the characteristic of offering a higher resistance to current which tends to flow from the copper to the oxide than to current which tends to flow in the opposite direction through the units.

Interposed in the rectifier stack adjacent the oxide surface of each asymmetric unit A is a contact washer B embodying my invention. These contact washers are all alike, and as best seen in Fig. 2, each washer comprises a metal disc 5 provided with a central aperture 6, and plated on both sides with lead which covers all but two small annular areas 7 surrounding the inner edge of the aperture 6. The disc 5 may be of iron, steel or any other suitable metal, and has the same inside diameter as the asymmetric units A, and an outside diameter which is slightly smaller than that of the asymmetric units. The lead may be plated onto the disc 5 by any of the well-known lead plating processes, and the plating is preferably continued until the coating attains a thickness of from 5 to 15 mills. During the plating process, the annular areas 7 may be prevented from becoming plated by suitable masks in accordance with standard plating practice.

With the contact washers constructed in this manner it will be apparent that since the discs 5 of these washers have the same inside diameter as the asymmetric units, they fit snugly over the insulating sleeve 4, and thus accurately maintain the contact washers in concentric relation with respect to the asymmetric units. It will also be apparent that since the lead plating is relatively thick, the discs 5 of the contact washers are prevented from touching any part of the asymmetric units. Moreover, inasmuch as the width of the plated area is smaller than the width of the oxidized area of the rectifier washers, the lead plating is effectively prevented from touching any part of the asymmetric units on their oxidized sides other than the adjacent face of the oxide coating, whereby short circuiting of the rectifier washers by the contact washers is effectively prevented.

If desired, the plated lead coating may be tinned to prevent its oxidation. Furthermore, for some types of assemblies, it may be desirable to plate the disc 5 on only one side, the other side being left unplated.

Interposed between the nut 2 and the left-hand unit A is a spring washer C and a conducting plate D, and interposed between the nut 3 and the right-hand contact washer B is a spring washer E, a pressure plate F, an insulating plate G, and a conducting plate H. The two spring washers C and E serve to maintain a uniform pressure on the units and the contact washers whereby the contact washers are firmly pressed into intimate contact with the oxide surface of the units, while the two plates D and H serve as a means for making connection to a source of current supply. It should be noted that when the rectifier is connected to a source of current supply, the rectifier will offer a relatively low resistance to current flowing from the plate H to the plate D, and a relatively high resistance to current flowing in the opposite direction.

The contact between the asymmetric units and the contact washers may in some instances be improved by rubbing finely divided carbon into the outer surface of the cuprous oxide, or by painting such surface with a colloidal emulsion of carbon in water such, for example, as the commercial product known as Aquadag.

One advantage of a contact washer embodying my invention is that it effectively prevents short circuits due to improper assembly.

Although I have herein shown and described only one form of electrical rectifier embodying my invention, it is understood that various changes and modifications may be made therein within the scope of the appended claims without departing from the spirit and scope of my invention.

Having thus described my invention, what I claim is:

1. As a new article of manufacture a contact washer for making contact with the oxide surface of a copper oxide rectifier comprising a disc of metal provided with a central aperture and plated on both sides with lead except for a small annular area adjacent said aperture.

2. A rectifier comprising an asymmetric unit clamped between conducting plates on a bolt surrounded by an insulating sleeve, said unit comprising a copper disc having a coating of cuprous oxide formed on one side thereof, and a contact member for making contact with the oxide coating of said asymmetric unit comprising a perforated disc having the same inside diameter as said unit and a slightly smaller outside diameter and plated on one side with lead on all but a small annular area adjacent the inner edge of the disc, said contact member being interposed in said stack with the lead coating in engagement with the oxide coating of said rectifier unit.

3. A contact member for making contact with the oxide surface of a copper oxide rectifier washer in a rectifier stack, said contact member comprising a disc of iron, steel or other metal having the same inside diameter as said rectifier washer and a slightly smaller outside diameter than the rectifier washer, said disc being plated on at least one side with lead which covers all but a small annular area adjacent the inner edge of the disc.

4. A contact member for making contact with the oxide surface of a copper oxide rectifier washer in a rectifier stack, said contact member comprising a disc of iron, steel or other metal having the same inside diameter as said rectifier washer and a slightly smaller outside diameter than the rectifier washer, said disc being plated on both sides with lead which covers all of the contiguous side but a small annular area adjacent the inner edge of the disc.

JOHN D. McCLUER.